United States Patent [19]

Nagai et al.

[11] Patent Number: 4,832,673
[45] Date of Patent: May 23, 1989

[54] TOOTHED BELT HAVING IMPROVED TOOTH COVER FABRIC

[75] Inventors: Takaji Nagai; Nobutaka Ohsako, both of Kobe, Japan

[73] Assignee: Mitsuboshi Belting, Ltd., Kobe, Japan

[21] Appl. No.: 91,767

[22] Filed: Sep. 1, 1987

[30] Foreign Application Priority Data

Sep. 1, 1986 [JP] Japan .................. 61-20678

[51] Int. Cl.$^4$ .............................................. F16G 5/08
[52] U.S. Cl. .................... 474/263; 474/267; 474/268
[58] Field of Search ............... 474/263, 266, 268

[56] References Cited

U.S. PATENT DOCUMENTS

| | | | |
|---|---|---|---|
| 3,078,206 | 2/1963 | Skura | 156/140 |
| 4,266,937 | 5/1981 | Takano | 474/263 X |
| 4,276,039 | 6/1981 | Takano | 474/267 X |
| 4,299,587 | 11/1981 | Imamura | 474/267 X |
| 4,498,891 | 2/1985 | Mashimo et al. | 474/268 X |
| 4,721,496 | 1/1988 | Yokoyama | 474/268 X |

FOREIGN PATENT DOCUMENTS

| | | | |
|---|---|---|---|
| 139341 | 5/1955 | European Pat. Off. | 474/268 |
| 40319 | 1/1980 | Japan . | |
| 9239 | 1/1984 | Japan . | |
| 39138 | 1/1986 | Japan . | |
| 7414 | 1/1987 | Japan . | |

*Primary Examiner*—George A. Suchfield
*Attorney, Agent, or Firm*—Wood, Dalton, Phillips, Mason & Rowe

[57] ABSTRACT

A toothed belt construction having a tooth cover fabric providing extended useful life of the belt. The cover fabric includes waft fibers extending longitudinally of the belt, having a toughness of at least approximately 30 where the toughness is a function of the square root of the elongation of the weft yarns at break and the strength of the west yarns at break in units of grams per denier. The elongation at break is preferably in the range of approximately 20 to 45%. The strength of the weft yarns at break is preferably at least approximately 6.0 grams per densier. Woolly processed yarns of polyamide fibers have been found to be particularly advantageous in the disclosed construction.

18 Claims, 1 Drawing Sheet

U.S. Patent May 23, 1989 4,832,673
FIG. 1
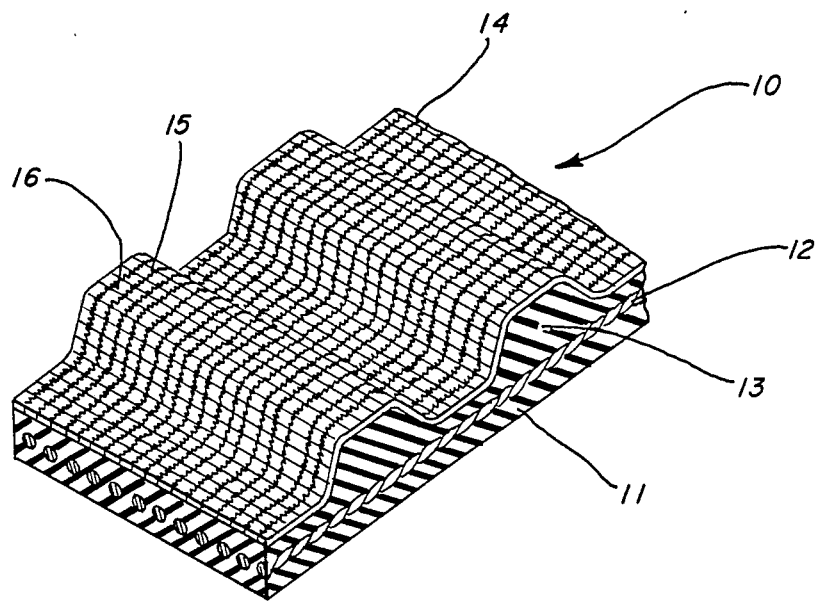
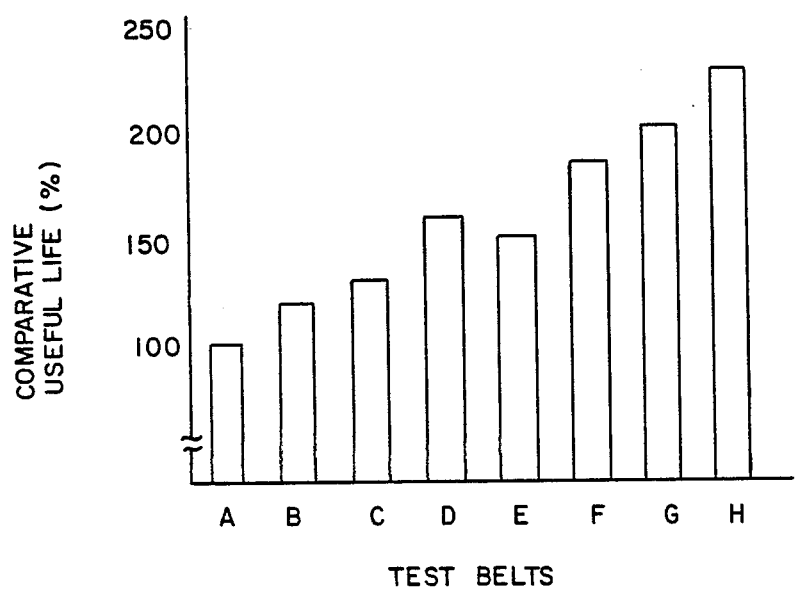
FIG. 2

4,832,673

TOOTHED BELT HAVING IMPROVED TOOTH COVER FABRIC

TECHNICAL BACKGROUND

This invention relates to toothed belts and in particular to toothed belts having a cover fabric on the teeth thereof.

BACKGROUND ART

It has been conventional to provide cover fabric on the teeth of toothed belts. However, where the fabric-covered toothed belt is utilized under severe operating conditions, such as involving high speed operation, high load transmission, high temperature and humidity environments, etc., there is a tendency for the teeth to have imperfect entrainment in the pulley grooves, resulting in deterioration of the teeth, such as by cracking and shearing.

A number of attempts have been made to solve this vexatious problem, including increasing the hardness of the rubber mixture forming the teeth, the use of the canvas-type cover fabric, and the use of canvas-type cover fabric in which woolly processed and crimped nylon yarns are incorporated as wefts, and expansive yarns are incorporated as warps, with the weft yarns extending longitudinally of the belt.

The woolly processed yarns so used conventionally comprise pile yarns having low strength so as to prevent ready woolly processing. Resultingly, the shearing resistance of the teeth utilizing such fabrics has been low and such fabrics have not proven completely satisfactory in the resolution of the problem.

Heretofore, the requirements of fabric strength and resistance of the teeth to shear have been incompatible requirements. Thus, there has been no completely satisfactory solution to this vexatious problem.

DISCLOSURE OF INVENTION

The present invention comprehends an improved toothed belt construction utilizing a tooth-covering fabric which provides substantially extended useful life of the belt at low cost and in a novel and simple manner.

More specifically, the invention comprehends the provision of such a tooth-covering fabric including weft fibers extending longitudinally of the belt, having a toughness of at least approximately 30 where the toughness is a function of the square root of the elongation of the weft fibers at break and the strength of the weft fibers at break in units of grams per denier.

More specifically, the invention comprehends such a toothed belt construction wherein the elongation at break is preferably in the range of approximately 20 to 45%.

Still further, the invention comprehends the provision of such a toothed belt construction wherein the strength at break of the weft fibers is at least approximately 6.0 grams per denier.

In the illustrated embodiment, the weft fibers are formed of a polyamide resin.

The fabric may comprise a woven fabric and, illustratively, may comprise a fabric selected from one or more of the group consisting of plain woven fabric, twill fabric, satin woven fabric, and multilayer woven fabric.

In the illustrated embodiment, the fabric comprises a single ply fabric.

In the illustrated embodiment, the weft fibers comprise woolly processed fibers. The invention comprehends that the weft fibers be mixed with elastic fibers.

The invention further comprehends that the weft fibers comprise filaments, as well as spun yarns.

The useful life of the toothed belts incorporating the tooth-covering fabric discussed above has been found to be substantially extended over the known fabric-covered belt structures.

The toothed belt structures of the present invention are extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a fragmentary perspective view of a toothed belt construction embodying the invention; and FIG. 2 is a graph illustrating the useful life of toothed belt constructions embodying the invention as compared to conventional toothed belt constructions.

BEST MODE FOR CARRYING OUT THE INVENTION

In the illustrative embodiment of the invention as disclosed in the drawing, a toothed belt generally designated 10 embodying the invention is shown to comprise a rubber body 11 provided with longitudinally extending tensile cords 12. A plurality of teeth 13 are formed in the inner portion of the body and the inner surface defining the teeth is covered with a fabric 14 embodying the invention.

The invention comprehends that the rubber body of the belt may be formed of conventional belt rubber, such as natural rubber, styrene-butadiene rubber, chloroprene rubber, nitrile rubber, and butyl rubber. Additionally, the belt body may be formed of synthetic resins, such as chlorosulfonated polyethylene, polyurethane, etc.

The tensile cords may be formed of any conventional suitable material providing low elongation and high strength, such as polyester resin, aliphatic polyamide resin, aromatic polyamide resin, glass fibers, and metal wires. In the illustrated embodiment, the tensile cords are disposed at the pitch line.

The portion of the rubber body defining the teeth may be formed of the same rubber as that in which the tensile cords are embedded, or may comprise a different rubber. Preferably, the tooth rubber is homogeneously bonded to the base rubber so as to provide a monolithic rubber belt structure.

As discussed briefly above, the invention comprehends the provision of an improved cover fabric 14 imparting high strength and deterioration resistance to the teeth so as to provide long, troublefree life of the belt. More specifically, the cover fabric 14 is provided with weft yarns 15 extending longitudinally of the belt having a toughness of at least 30 where the toughness is the product of the square root of the elongation of the weft yarns at break and the strength of the weft yarns at break in units of grams per denier. The illustrated fabric 14 is a canvas fabric. As discussed above, the fabric may comprise plain woven fabric, twill fabric, satin woven fabric, and multilayer woven fabric, as desired.

The warp yarns 16 of the fabric may be made of suitable material, such as polyamide resin filaments.

More specifically, the weft yarns may comprise filament yarns or spun yarns, as desired. Woolly processed yarns of polyamide fibers have been found to be ideally suited for this application.

The invention further comprehends that the strength of the weft yarns at break be at least approximately 6.0 grams per denier and that the elongation of the weft yarns at break be in the range of approximately 20 to 45%.

In the illustrated embodiment, the cover fabric 14 comprises a single ply, permitting ready adjustment of the pitch line difference for facilitated manufacture and long, troublefree useful life.

The weft yarns may include elastic fibers for facilitated control of the strength and elongation characteristics.

As indicated in the following Table 1 and Table 2, the toothed belt construction 10 utilizing the improved tooth cover fabric provides substantially improved useful life of the belt. The belt 10 exhibits substantially improved resistance to jumping of the teeth from the pulleys in operation of the belt and substantially improved resistance to shearing and cracking of the tooth portion relative to the base portion of the belt.

As will be obvious to those skilled in the art, the invention may be utilized not only with toothed belts, but also with cogged belts, within the broad scope of the invention. As shown in detail in Tables 1 and 2 and in FIG. 2 of the drawing, three prior art structure belts were constructed as indicated in Table 1, five belts in accordance with the present invention were constructed in accordance with Table 2, and the comparative useful life of these belts determined as shown in FIG. 2 of the drawing.

TABLE 1

|  | A | B | C |
|---|---|---|---|
| Type of weft yarn | Woolly processed | Strong twisted | Mixture with Elastic fibers |
| Strength of weft yarn g/d | 4.5 | 6.5 | 6.5 |
| Elongation of weft yarn (%) | 30 | 18 | 18 |
| Toughness of weft yarn | 24.6 | 27.6 | 27.6 |
| Warp yarn | Polyamide filament | Polyamide filament | Polyamide filament |

TABLE 2

|  | D | E | F | G | H |
|---|---|---|---|---|---|
| Type of weft yarn | Woolly processed | Mixture with Elastic fibers | Mixture with Elastic fibers | Mixture with Elastic fibers | Mixture with Elastic fibers |
| Strength of weft yarn g/d | 6.0 | 7.0 | 6.6 | 6.6 | 7.8 |
| Elongation of weft yarn (%) | 43 | 23 | 23 | 36 | 30 |
| Toughness of weft yarn | 39.3 | 33.6 | 31.7 | 38.6 | 42.7 |
| Warp yarn | Polyamide filament | Polyamide filament | Polyamide filament | Polyamide filament | Polyamide filament |

As shown in FIG. 2, the useful life of the belt constructions utilizing the tooth cover fabric of the invention was substantially greater than that of the conventional belt structures. The belt samples were tested at an 80° C. ambient temperature in a test system having a drive pulley provided with 20 teeth, a driven pulley provided with 40 teeth and rotated at 7200 r.p.m. A 7 P/S load was applied under an initial tension of 15 kgf.

By controlling the above discussed parameters of the fabric construction, bending fatigue has been reduced, thereby effectively reducing shearing and cracking at the roots of the teeth, while concurrently providing improved resistance to degradation of the teeth and jumping of the teeth from the drive system pulleys under severe operating conditions.

The foregoing disclosure of specific embodiments is illustrative of the broad inventive concepts comprehended by the invention.

We claim:

1. A toothed belt comprising:
   a rubber body having an outer portion and an inner portion comprising a series of longitudinally spaced power transmitting teeth defining an inner surface;
   a tensile cord extending longitudinally of the belt in said outer portion; and
   a cover fabric on said inner surface of the teeth including weft fibers extending longitudinally of the belt and having a toughness of at least 30, an elongation at break in the range of approximately 20 to 45%, and a strength at break of at least approximately 6.0 g/d, where said toughness is the product of the square root of the elongation at break and the strength at break in units of grams/denier.

2. The toothed belt of claim 1 wherein said weft fibers are formed of a polyamide resin.

3. The toothed belt of claim 1 wherein said fabric comprises a woven fabric.

4. The toothe belt of claim 1 wherein said fabric comprises a fabric selected from one or more of the groups consisting of plain woven fabric, twill fabric, satin woven fabric, and multilayer woven fabric.

5. The toothed belt of claim 1 wherein said fabric comprises a single ply fabric.

6. The toothed belt of claim 1 wherein said weft fibers comprise woolly processed fibers.

7. The toothed belt of claim 1 wherin said weft fibers are mixed with elastic fibers.

8. The toothed belt of claim 1 wherein said weft fibers comprise filaments.

9. The toothed belt of claim 1 wherein said weft fibers comprise spun yarns.

10. A toothed belt comprising:
    a rubber body having an outer portion and an inner portion comprising a series of longitudinally spaced power transmitting teeth defining an inner surface;
    a tensile cord extending longitudinally of the belt in said outer portion; and a cover fabric on said inner surface of the teeth including weft fibers extending longitudinally of the belt and having a toughness of at least 30.

11. The toothed belt of claim 10 wherein said weft fibers are formed of a polyamide resin.

12. The toothe belt of claim 10 wherein said fabric comprises a woven fabric.

13. The toothed belt of claim 10 wherein said fabric comprises a fabric selected from one or more of the groups consisting of plain woven fabric, twill fabric, satin woven fabric, and multilayer woven fabric.

14. The toothed belt of claim 10 wherein said fabric comprises a single ply fabric.

15. The toothed belt of claim 10 wherein said weft fibers comprising woolly processed fibers.

16. The toothed belt of claim 10 wherein said weft fibers are mixed with elastic fibers.

17. The toothed belt of claim 10 wherein said weft fibers comprise filaments.

18. The toothed belt of claim 10 wherein said weft fibers comprise spun yarns.

* * * * *